(12) United States Patent
Ono

(10) Patent No.: US 7,162,209 B2
(45) Date of Patent: Jan. 9, 2007

(54) FOLDABLE CELLULAR PHONE SET

(75) Inventor: Shuichi Ono, Tokyo (JP)

(73) Assignee: NEC Corporation, Tokyo (JP)

( * ) Notice: Subject to any disclaimer, the term of this patent is extended or adjusted under 35 U.S.C. 154(b) by 480 days.

(21) Appl. No.: 10/285,582

(22) Filed: Nov. 1, 2002

(65) Prior Publication Data

US 2003/0087610 A1    May 8, 2003

(30) Foreign Application Priority Data

Nov. 5, 2001    (JP) .............................. 2001-339483

(51) Int. Cl.
H04B 1/38    (2006.01)
(52) U.S. Cl. .................. 455/90.3; 455/575.1; 455/128; 379/433.13; 379/434
(58) Field of Classification Search ............... 455/90.3, 455/95, 100, 575.1, 550.1, 424, 425, 346, 455/347, 348, 561, 351, 128, 41.2, 81; 439/165, 439/607, 76.1, 31; 385/25, 14, 146, 8, 53, 385/147, 15, 33, 89, 92, 70, 71, 76, 77; 398/131, 398/140, 115, 154, 201; 379/433.13, 434, 379/433, 22.06
See application file for complete search history.

(56) References Cited

U.S. PATENT DOCUMENTS 5,014,346 A * 5/1991 Phillips et al. ........... 455/575.7
5,039,193 A * 8/1991 Snow et al. ................... 385/25
5,661,641 A    8/1997 Shindo
6,028,764 A    2/2000 Richardson et al.
6,470,132 B1 * 10/2002 Nousiainen et al. ........ 385/146
2002/0135993 A1 * 9/2002 Ueyama et al. ............. 361/814
2003/0063863 A1 * 4/2003 Nardelli et al. ............... 385/53

FOREIGN PATENT DOCUMENTS

| CN | 1140270 A | 1/1997 |
| EP | 1 217 501 A2 | 6/2002 |
| GB | 2 324 674 A | 10/1998 |
| GB | 2 351 201 A | 12/2000 |
| JP | 10-097346 | 4/1998 |
| JP | 10-187305 | 7/1998 |
| JP | 10-304039 | 11/1998 |
| JP | 11-259175 | 9/1999 |
| JP | 11-308173 | 11/1999 |
| JP | 2001-022472 | 1/2001 |

\* cited by examiner

Primary Examiner—Lana Le
Assistant Examiner—Charles Chow
(74) Attorney, Agent, or Firm—Young & Thompson

(57) ABSTRACT

This invention relates to an electronic device or foldable cellular phone set in which boards arranged in two casings bendably connected to each other through a connecting portion are electrically connected to each other by a wireless communication unit using infrared rays or the like. As the wireless communication unit, either an optical method using infrared rays or the like, or a radio wave method using a radio wave can be used.

3 Claims, 7 Drawing Sheets

FOLDABLE CELLULAR PHONE SET

BACKGROUND OF THE INVENTION

1. Field of the Invention

The present invention relates to an electronic device, e.g., a foldable cellular phone set, having a bendable portion and, more particularly, to an electronic device in which the electrical connection of the bendable connecting portion is improved.

2. Description of the Prior Art

As shown in FIG. 1, a foldable cellular phone set 60 is comprised of one side portion 62 having a display screen 61 and the like, and the other side portion 72 having input buttons 63 and the like. The two side portions 62 and 72 are bendably connected at substantially their central position by a connecting portion 80, so they can be opened/closed. As shown in FIG. 2, one side portion 62 of the foldable cellular phone set 60 is comprised of a first front casing 64 and first back lid 66 that can be divided in the front and back directions. The other side portion 72 is similarly formed of a second front casing 74 and second back lid 76. The connecting portion 80 has a connecting member 80a on the first front casing 64 side and a connecting member 80b on the second front casing 74 side. The connecting members 80a and 80b are built in the connecting portion 80 together with other connecting members, so the connecting portion 80 is pivotal.

As shown in FIG. 3, one side portion 62 of the foldable cellular phone set has a first board 52, to which a liquid crystal panel for the display screen 61 and a receiver for producing the voice of the other party are to be connected, such that the board 52 is stored between the first front casing 64 and first back lid 66. The other side portion 72 has a second board 54, to which contact components of the input buttons 63 for inputting telephone numbers and the like and a microphone are to be connected, such that the board 54 is stored between the second front casing 74 and second back lid 76.

As shown in FIG. 3, the first and second boards 52 and 54 are electrically connected through a flexible FPC (Flexible Printed Circuit board) 50. The FPC 50 is connected at its one end to the first board 52 through a connector 56, and at its other end to the second board 54 through a connector 58. The FPC 50 is twisted by one turn to form one helical loop at its substantial center in the longitudinal direction, and is connected to the first and second boards 52 and 54. The first and second boards 52 and 54 are fixed to the first and second front casings 64 and 74, respectively, and the first and second back lids 66 and 76 are attached to the first and second front casings 64 and 74, respectively so the first and second boards 52 and 54 are stored. In this manner, since the FPC 50 is stored in the connecting portion 80 as it is twisted by one turn, one and the other side portions 62 and 74 respectively storing the first and second boards 52 and 54 can folded while maintaining electrical connection to each other.

In another prior art disclosed in Japanese Unexamined Patent Publication No. 11-308173, photocouplers are formed on those portions of two casings through which the casings are foldably connected to each other. The casings are electrically connected to each other through the photocouplers.

In the conventional foldable cellular phone set, the FPC connectors 56 and 58 are mounted on the respective boards. The two ends of the FPC 50 are fitted in the connectors 56 and 58, so the first and second boards 52 and 54 are electrically connected to each other. Hence, the manufacturing line requires the operation of building the FPC 50 to the connectors 56 and 58 and the like, which is cumbersome. Since the ends of the FPC 50 are thin, when they are to be fitted in the connectors, the connector 56 may be damaged, or the FPC 50 may undesirably bend. Furthermore, if the FPC 50 and connector 56 and the like are not sufficiently fitted with each other, they cause defective electrical connection, resulting in a defective product.

The FPC 50 is twisted into a loop in the connecting portion 80, and is usually in substantially tight contact with the inner surface of the connecting portion 80. When water enters through the connecting portion 80, capillarity occurs between the FPC 50 and the inner surface of the connecting portion 80, and the water may flow deeply into the connecting portion 80 to wet the first board 52 and the like. This causes corrosion of the first board 52 and the like to lead to a trouble or the like. As the FPC 50 runs from the inside to the outside of the connecting portion 80, the connecting portion 80 cannot be sealed completely.

As the functions of the cellular phone set increase, the amount of information transmitted between the first and second boards 52 and 54 increases. To transmit the information, it is required to increase the number of signal lines in the FPC 50. The space in the connecting portion 80 through which the FPC 50 can run is limited. If the width of the FPC 50 is increased in an attempt to increase the number of signal lines, the FPC 50 cannot run through the connecting portion 80. In addition, in recent years, demands for downsizing of the cellular phone set increase. To increase the width of the connecting portion 80 for the FPC 50 leads to an increase in size of the phone set main body, failing to downsizing. Information transmission using the FPC 50 is reaching its limit.

According to the invention disclosed in Japanese Unexamined Patent Publication No. 11-308173, the casings are electrically connected to each other through the photocouplers respectively provided to the two casings. The two photocouplers abut against each other when the respective casings are opened completely. During opening/closing operation, communication between the two photocouplers is disconnected.

SUMMARY OF THE INVENTION

The present invention has been made to solve the above inconveniences of the prior art, and has as its object to provide an electronic device or foldable cellular phone formed by foldably connecting two casings, which can be assembled easily, perform communication reliably, cope with a large communication amount, and always make electrical connection regardless of the folded state of the casings, so downsizing and cost reduction can be realized.

In order to achieve the above object, according to the present invention, there is provided an electronic device or foldable cellular phone set, in which boards arranged in two casings foldably connected to each other through a connecting portion are electrically connected to each other by a wireless communication means using infrared rays or the like. More specifically, transmission/reception modules for infrared communication (IrDA) are arranged in the connecting portion coaxially with the rotation axis of the connecting portion, such that they oppose each other. Even when the connecting portion of the foldable cellular phone set is bent, the transmission/reception surfaces of the transmission/reception modules can always oppose each other, and communication between them is not disconnected by folding operation.

As the wireless communication means, ultraviolet rays, visible light, and a radio wave with a weak output can be used in addition to the infrared rays. When the transmitting/receiving portions use light, their transmitting/receiving surfaces must oppose each other. When the transmitting/receiving portions use a radio wave, their transmitting/receiving surfaces need not oppose each other, and transmission/reception antennas may be appropriately arranged on the two casings respectively. When the pivot angle of the connecting portion is not large, the boards may be connected by using optical fibers.

The transmission/reception modules can be arranged at that portion of the connecting portion having the conventional structure where the FPC used to run. When the FPC is used, it is twisted and arranged, so a substantially cylindrical space is formed in advance. When the transmission/reception modules are arranged at the portion where the FPC used to run, a connecting method which uses infrared modules and the like can be easily applied to the structure of the conventional foldable cellular phone set in which the transmission/reception modules are connected by using the FPC, without largely changing the shape of the basic constituent components such as casings.

As is apparent from the above aspects, with the electronic device or foldable cellular phone set that can be obtained by the present invention, the cumbersome operation of connecting the FPC can be omitted, so the assembly cost can be reduced. In particular, as the IrDA modules can be mounted on the boards by an automatic mounter or the like, they do not need manual assembly unlike in the case using the FPC, so the assembly cost can be reduced largely.

Damage to the FPC connector which occurs when connecting the FPC to the FPC connector can be prevented. Also, disconnection in the FPC, which is due to the bending of the FPC, can be prevented.

Water can be prevented from entering the foldable cellular phone set through the connecting portion. Even if water should enter the phone set, it does not come in contact with any board.

Even if the amount of information exchanged between the connected boards increases, this increase in the amount of information can be easily coped with without adding or enlarging the interconnections structurally, unlike in the case of connection using wires.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF THE PREFERRED EMBODIMENT

Several preferred embodiments of the present invention will be described with reference to the accompanying drawings by way of a foldable cellular phone set.

Figure 1:
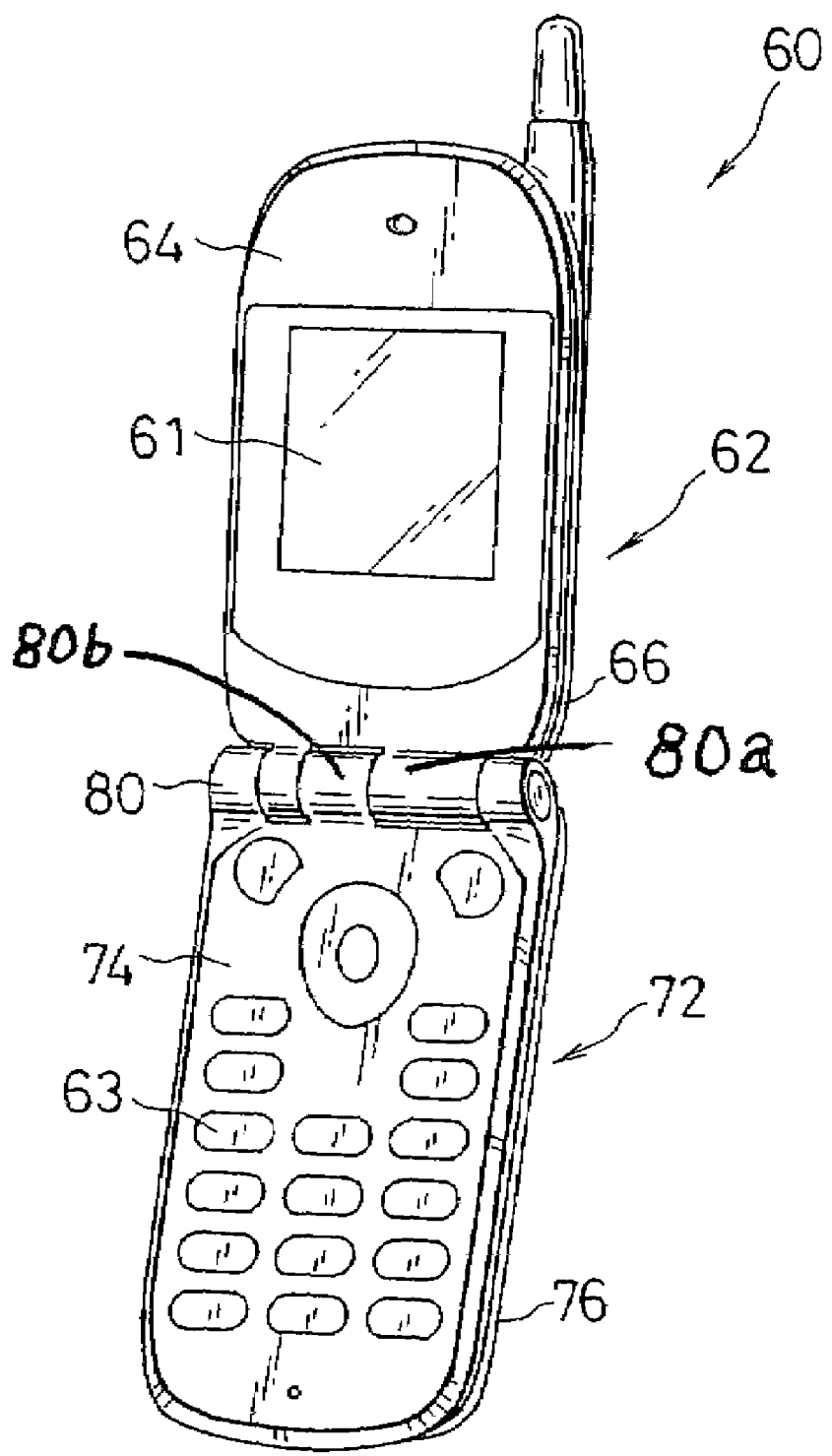
FIG. 1 is a perspective view showing the outer appearance of a conventional foldable cellular phone set.
Figure 3:
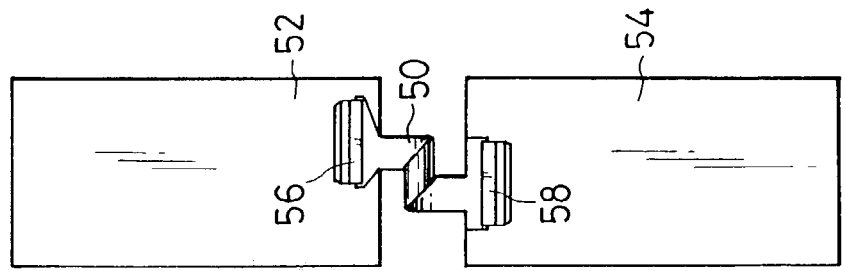
FIG. 3 is a plan view showing the boards of the conventional foldable cellular phone set.
Figure 2:
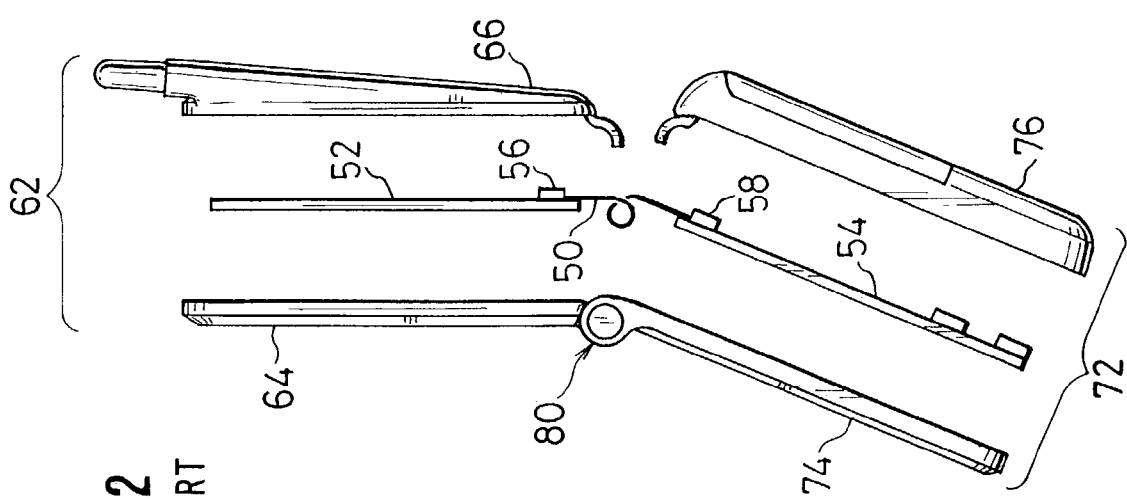
FIG. 2 is an exploded side view showing components of the conventional foldable cellular phone set.
Figure 4:
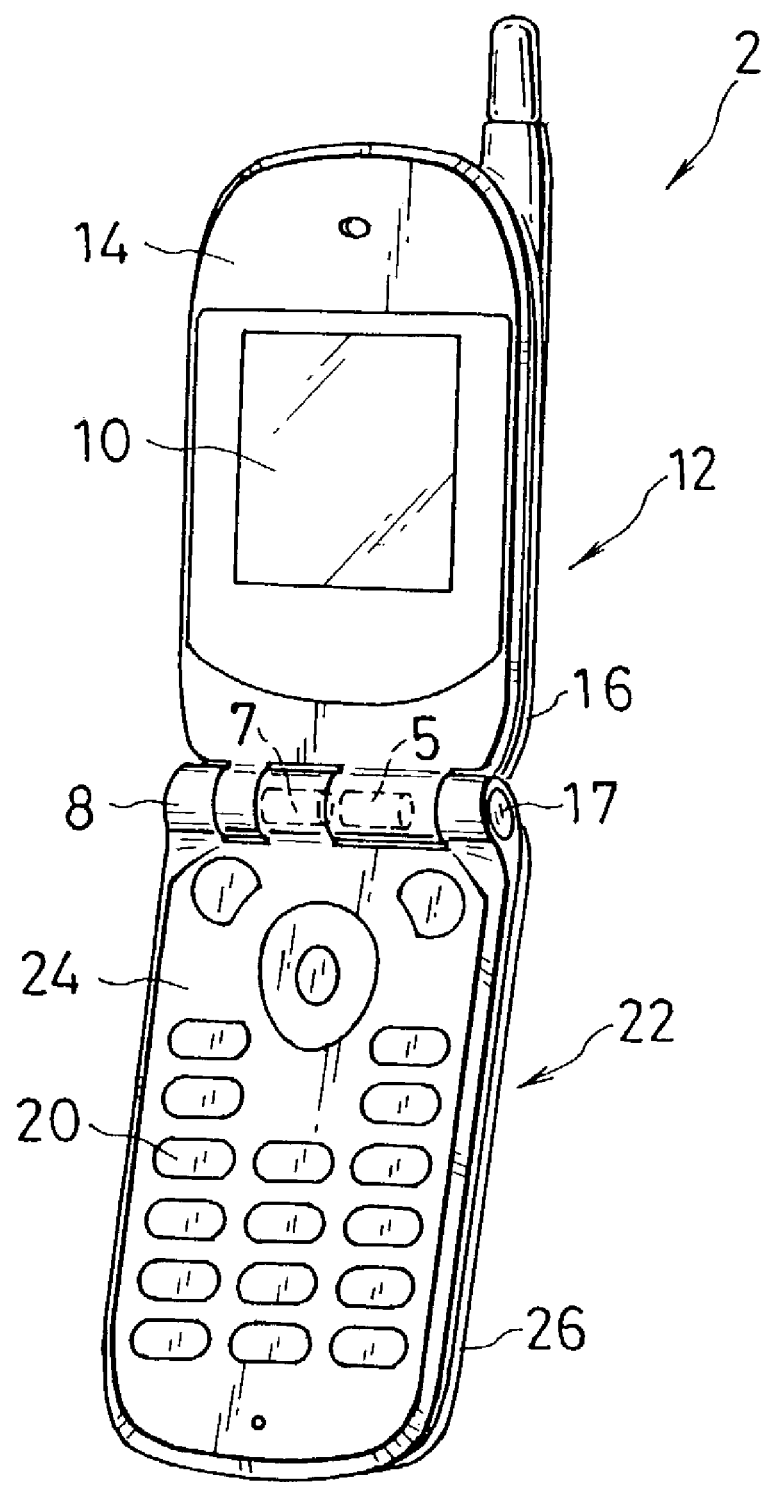
FIG. 4 is a perspective view showing the outer appearance of a foldable cellular phone set of the present invention.
Figure 6:
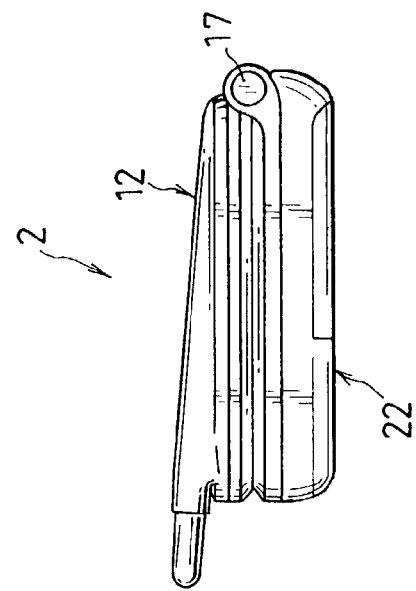
FIG. 6 is a side view showing the foldable cellular phone set of the present invention in the folded state.
Figure 5:
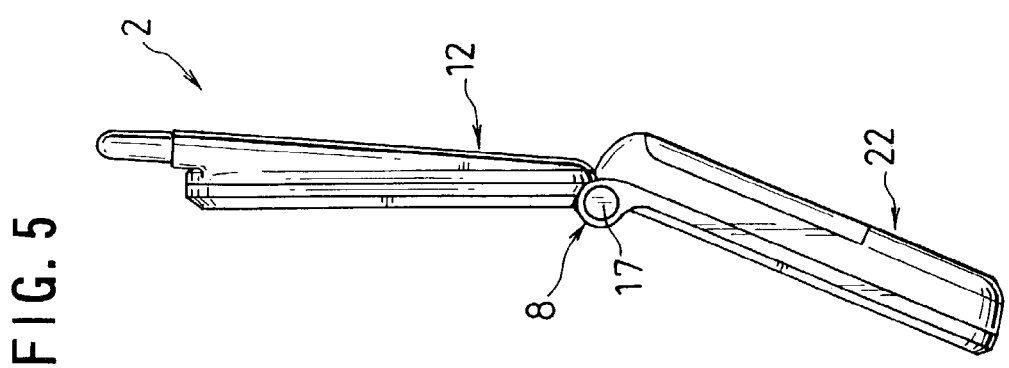
FIG. 5 is a side view showing the foldable cellular phone set of the present invention in the open state.

FIG. 4 shows a foldable cellular phone set 2 of the present invention entirely. Similarly to the conventional foldable cellular phone set 60, the foldable cellular phone set 2 is comprised of one side portion 12 having a display screen 10 and the like, and the other side portion 22 having input buttons 20 and the like. As shown in FIGS. 5 and 6, one and the other side portions 12 and 22 are foldably connected to each other at substantially their center by a connecting portion 8. FIG. 5 shows an open state, and FIG. 6 shows a folded state.

Figure 7:
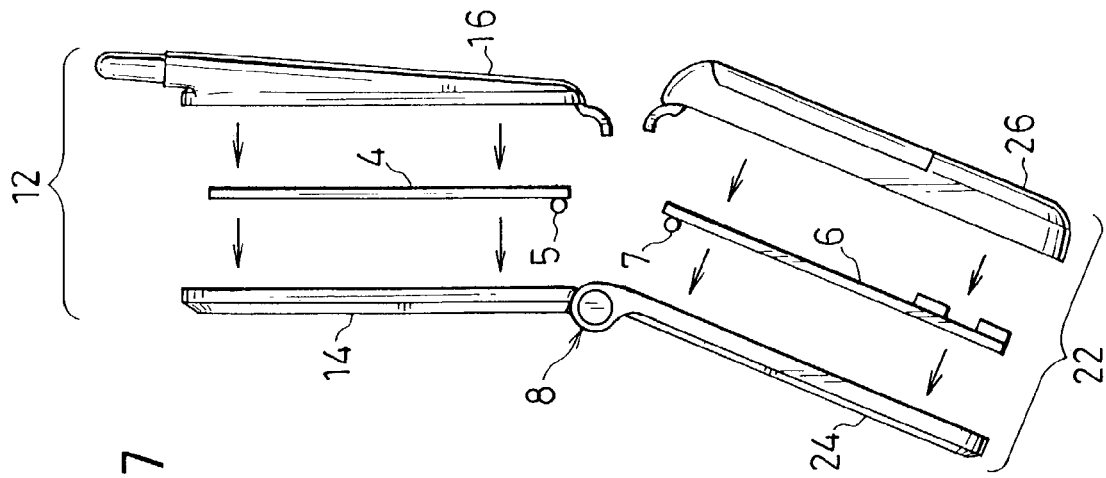
FIG. 7 is an exploded side view showing components of the foldable cellular phone set of the present invention.

As shown in FIG. 7, one side portion 12 is formed of a first front casing 14 and first back lid 16 to be respectively fitted in its front and back sides, and a first board 4 to be inserted between the first front casing 14 and the first back lid 16. A connecting member 8a to serve as part of the connecting portion 8 is formed on the first front casing 14 on the connecting portion 8 side.

As shown in FIG. 7, the other side portion 22 is formed of a second front casing 24 and second back lid 26 to be respectively fitted in its front and back sides, and a board 6 to be inserted between the second front casing 24 and the second back lid 26. A connecting member 8b to serve as part of the connecting portion 8 is formed on the second front casing 24 on the connecting portion 8 side.

Figure 8:
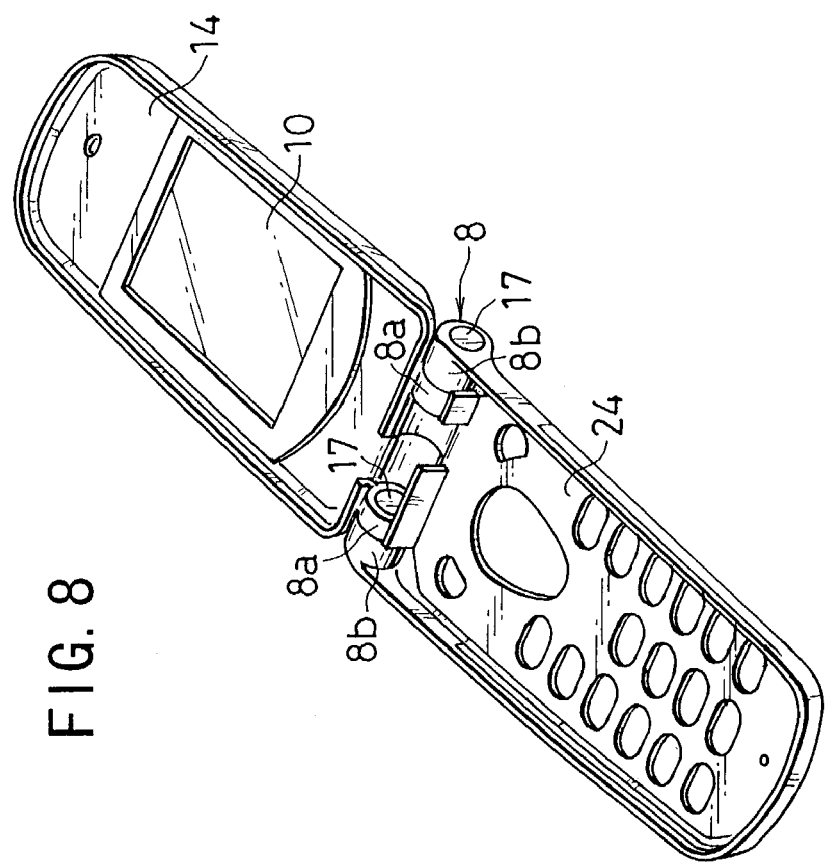
FIG. 8 is a rear perspective view showing the two front casings of the foldable cellular phone set of the present invention.

As shown in FIG. 8, the connecting portion 8 is substantially cylindrical as a whole, and has stoppers 17 at its two ends for pivotally stopping the respective connecting members of one and the other side portions 12 and 22. A cylindrical space is formed in the center of the connecting portion 8.

Figure 9:
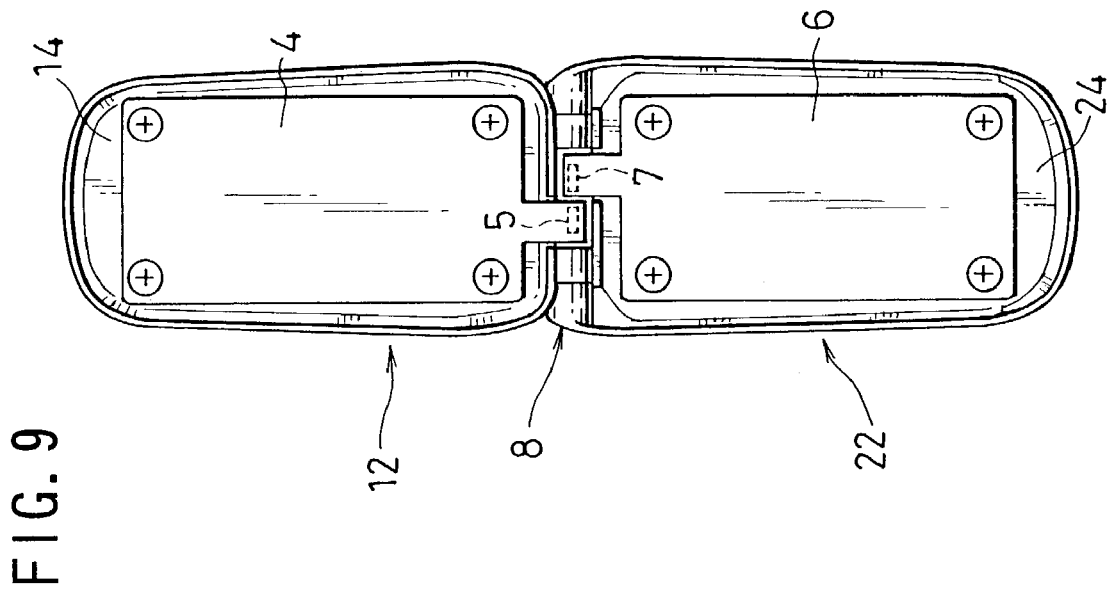
FIG. 9 is a plan view showing how the boards are attached in the foldable cellular phone set of the present invention.

A liquid crystal panel for the display and a receiver for producing the voice of the other party are mounted on the first board 4. The contact components of the buttons for inputting telephone numbers and the like, a microphone, and the like are mounted on the board 6. FIG. 9 shows a state wherein the first and second boards 4 and 6 are respectively fixed to the first and second front casings 14 and 24.

Figure 10:
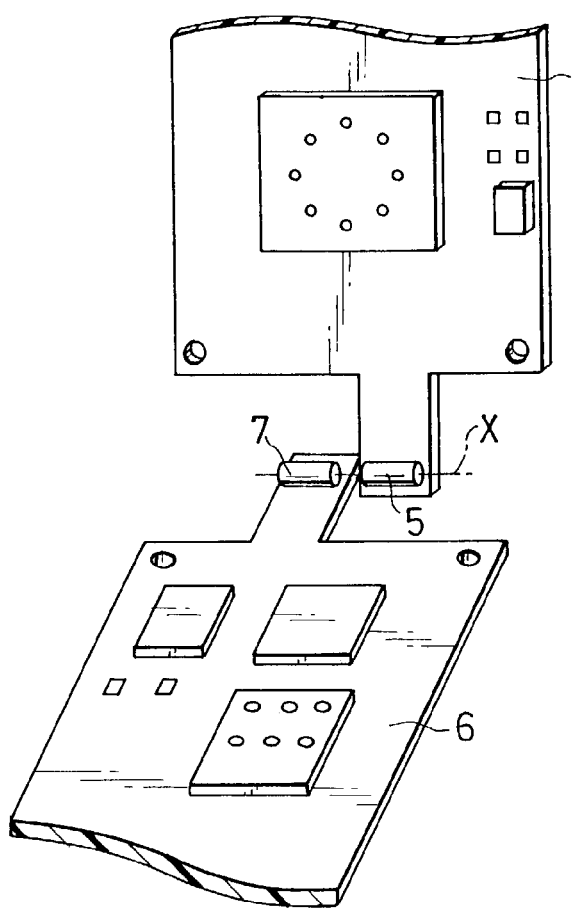
FIG. 10 is a perspective view showing the two boards of the foldable cellular phone set of the present invention.
Figure 11:
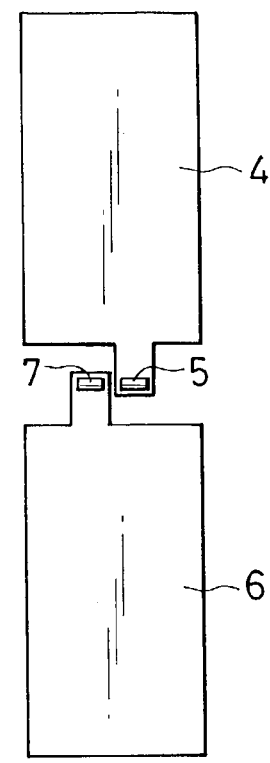
FIG. 11 is a plan view showing the two boards of the foldable cellular phone set of the present invention.
Figure 12:
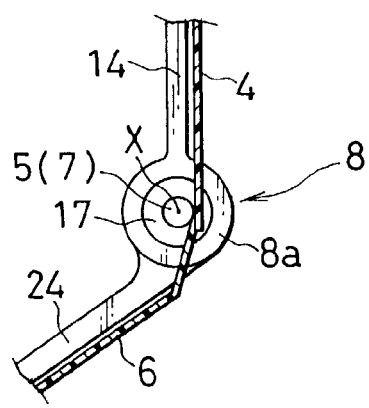
FIG. 12 is a partial sectional view showing the connecting portion of the foldable cellular phone set of the present invention.
Figure 13:
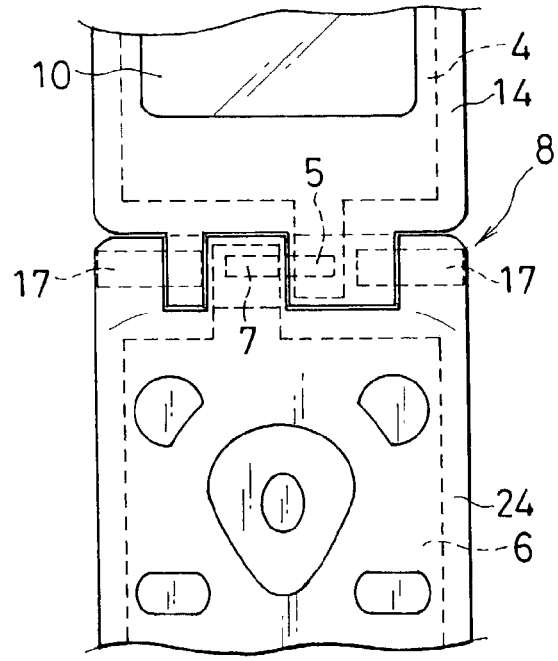
FIG. 13 is a partial plan view showing the connecting portion of the foldable cellular phone set of the present invention.

As shown in FIGS. 9 to 11, infrared modules 5 and 7 are attached to the first and second boards 4 and 6 on the connecting portion 8 sides. In FIG. 10, a line denoted by a reference character X shows a rotation axis of the connecting portion 8. The infrared module 5 having an infrared-ray-receiving/emitting element (not shown) in it converts a signal from the first board 4 into infrared rays and emits an infrared signal. Upon reception of an infrared signal, the infrared module 5 converts it into an electrical signal and sends it to the first board 4. The infrared module 7 has the same arrangement as that of the infrared module 5. The infrared modules 5 and 7 oppose each other with their light-receiving/emitting surfaces, as shown in FIG. 13, and are attached to the first and second boards 4 and 6, respectively, such that their two center axes coincide with the rotation axis X of the connecting portion 8, as shown in FIG. 12, when the first and second boards 4 and 6 are respectively fixed to the first and second front casings 14 and 24.

In this manner, in the foldable cellular phone set 2 of the present invention, since the center axes of the infrared modules 5 and 7 are arranged coaxially with the rotation axis X of the connecting portion 8, the positional relationship between the infrared modules 5 and 7 relative to each other does not change at all whether in the open state or the folded state, as shown in FIGS. 5 and 6, and the infrared modules 5 and 7 are constantly held to oppose each other.

Therefore, no matter how the connecting portion 8 of the foldable cellular phone set 2 is bent (rotated) during communication using the infrared modules 5 and 7, communication can be maintained. The foldable cellular phone set 2 can operate not only in the open state but also in any state.

Other than the above embodiment, the infrared modules 5 and 7 may come into tight contact with the inner surface of the connecting portion 8, or the gap between the first or second board 4 or 6 extending from one or the other side portion 12 or 22, respectively, and one or the other side portion 12 or 22 may be waterproofed. This can prevent water or the like from entering one and the other side portions 12 and 22 through the connecting portion 8. At this time, the transmitting/receiving surfaces of the infrared modules 5 and 7 may expose from the foldable cellular phone set 2 or may be inside the connecting portion 8.

Figure 14:
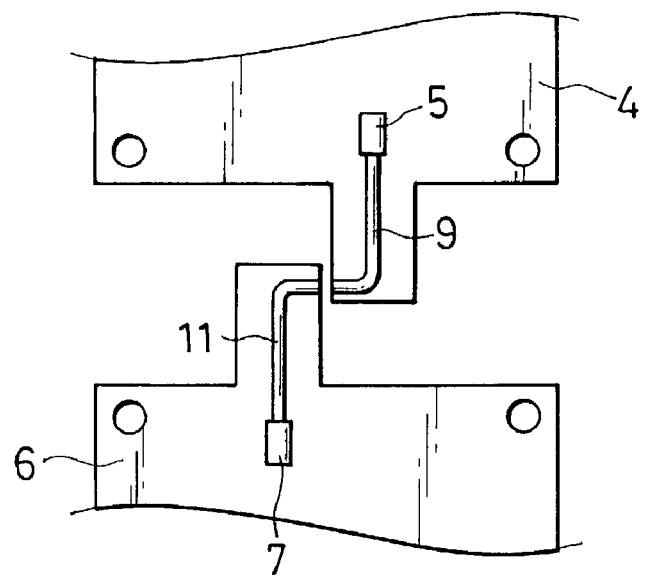
FIG. 14 is a partial plan view showing another example of the foldable cellular phone set of the present invention.

The infrared modules 5 and 7 need not be formed in the connecting portion 8, but may be formed at appropriate portions of the main bodies of the first boards 4 and 6 arranged in one and the other side portions 12 and 22, respectively, and may be connected to each other through optical fibers 9 and 11, as shown in FIG. 14. In this case, one end of the optical fiber 9 is attached to the light-receiving/emitting surface of the infrared module 5. The other end of the optical fiber 9 runs into the connecting portion 8 and is arranged coaxially with the rotation axis of the connecting portion 8. One end of the optical fiber 11 is attached to the light-receiving/emitting surface of the infrared module 7. The other end of the optical fiber 11 runs into the connecting portion 8 and is arranged coaxially with the rotation center of the connecting portion 8, so it opposes the end face of the optical fiber 9.

With this arrangement, infrared communication is performed through the optical fibers 9 and 11. The other end face of the optical fiber 9 and that of the optical fiber 11 constantly oppose each other regardless of whether the foldable cellular phone set 2 is folded or not. Hence, communication is not disconnected.

Figure 15:
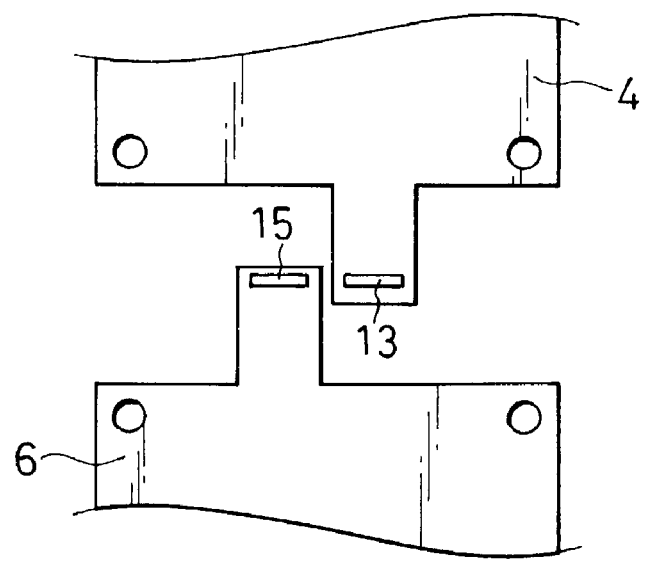
FIG. 15 is a partial plan view showing still another example of the foldable cellular phone set of the present invention.

Furthermore, according to the present invention, one and the other side portions 12 and 22 may be connected to each other by a radio wave method, in place of the infrared modules 5 and 7. In this case, the first and second boards 4 and 6 have a wireless transmitting/receiving function (not shown) with a predetermined frequency and output. As shown in FIG. 15, antennas 13 and 15 are formed in the connecting portion 8 or at those positions of one and the other side portions 12 and 22 where a radio wave can be transmitted or received. Hence, one and the other side portions 12 and 22 can transmit and receive signals to and from each other through the antennas 13 and 15 regardless of whether the foldable cellular phone set 2 is folded. Also, since the antennas can be formed even when the connecting portion 8 is sealed, entering of water or the like can be prevented reliably.

What is claimed is:

1. A foldable cellular phone set comprising:
   first and second casings that are foldably connected to each other with two hinges along a folding axis, said two hinges being at opposite ends of said folding axis spaced apart from each other;
   a first circuit board having a first longitudinal extension that extends into a space between said two hinges and a second circuit board having a second longitudinal extension that extends into the space between said two hinges, said first and second circuit boards being mounted in said first and second casings, respectively, and said first and second longitudinal extensions being directly adjacent to each other in the space between said two hinges and separate from said two hinges; and
   a first infrared module mounted on said first longitudinal extension and a second infrared module mounted on said second longitudinal extension, said first and second infrared modules having light-receiving/emitting surfaces that face each other along said folding axis, said first and second infrared modules communicating with each other using infrared rays to provide a communication link between said first and second circuit boards.

2. The foldable cellular phone set of claim 1, wherein said first and second infrared modules are mounted on respective ones of said first and second longitudinal extensions coaxially with said folding axis.

3. A foldable cellular phone set comprising:
   first and second casings that are foldably connected to each other with two hinges along a folding axis, said two hinges being at opposite ends of said folding axis spaced apart from each other;
   a first circuit board having a first longitudinal extension that extends into a space between said two hinges and a second circuit board having a second longitudinal extension that extends into the space between said two hinges, said first and second circuit boards being mounted in said first and second casings, respectively, and said first and second longitudinal extensions being directly adjacent to each other in the space between said two hinges and separate from said two hinges;
   a first infrared module mounted on said first circuit board and a second infrared module mounted on said second circuit board, said first and second infrared modules having light-receiving/emitting surfaces; and
   first and second optical fibers that are connected to respective said light receiving/emitting surfaces of said first and second infrared modules, said first and second optical fibers extending along respective ones of said first and second longitudinal extensions transverse to said folding axis and bending adjacent to said folding axis so that respective light receiving/emitting ends of said first and second optical fibers face each other along said folding axis, said first and second infrared modules communicating with each other using infrared rays to provide a communication link between said first and second circuit boards.

* * * * *